(12) United States Patent
Froc et al.

(10) Patent No.: US 9,838,114 B2
(45) Date of Patent: Dec. 5, 2017

(54) METHOD AND MONITORING DEVICE FOR DETERMINING EQUALIZATION PARAMETERS, COMPUTER PROGRAM, INFORMATION STORAGE MEANS

(71) Applicant: MITSUBISHI ELECTRIC CORPORATION, Tokyo (JP)

(72) Inventors: Gwillerm Froc, Rennes (FR); Olivier Weppe, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/026,177

(22) PCT Filed: Oct. 7, 2014

(86) PCT No.: PCT/JP2014/077275
§ 371 (c)(1),
(2) Date: Mar. 30, 2016

(87) PCT Pub. No.: WO2015/079815
PCT Pub. Date: Jun. 4, 2015

(65) Prior Publication Data
US 2016/0248501 A1    Aug. 25, 2016

(30) Foreign Application Priority Data
Nov. 27, 2013    (EP) .................................. 13194717

(51) Int. Cl.
*H04B 10/079*    (2013.01)
*H04B 10/2507*    (2013.01)
(Continued)

(52) U.S. Cl.
CPC ..... *H04B 10/0795* (2013.01); *H04B 10/2507* (2013.01); *H04B 10/272* (2013.01);
(Continued)

(58) Field of Classification Search
None
See application file for complete search history.

(56) References Cited

U.S. PATENT DOCUMENTS

2005/0201757 A1* 9/2005 Bohn ................. H04B 10/2507
398/149
2013/0188956 A1* 7/2013 Abe ....................... H04B 10/50
398/79

FOREIGN PATENT DOCUMENTS

EP    0 577 036 A1    1/1994
EP    1 056 231 A2    11/2000
(Continued)

OTHER PUBLICATIONS

Mayweather et al., "Wavelength Tracking of a Remote WDM Router in a Passive Optical Network", IEEE Photonics Technology Letters, vol. 8, No. 9, Sep. 1996, pp. 1238-1240.

*Primary Examiner* — Darren E Wolf
(74) *Attorney, Agent, or Firm* — Birch, Stewart, Kolasch & Birch, LLP

(57) ABSTRACT

For determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, a monitoring device performs: determining information representative of a level of detuning between the carrier wavelength of the optical signals and the nominal wavelength of the optical band-pass filter; and determining said equalization parameters, on the basis of said determined information representative of the level of detuning between the carrier wavelength of the
(Continued)

Figure 1:
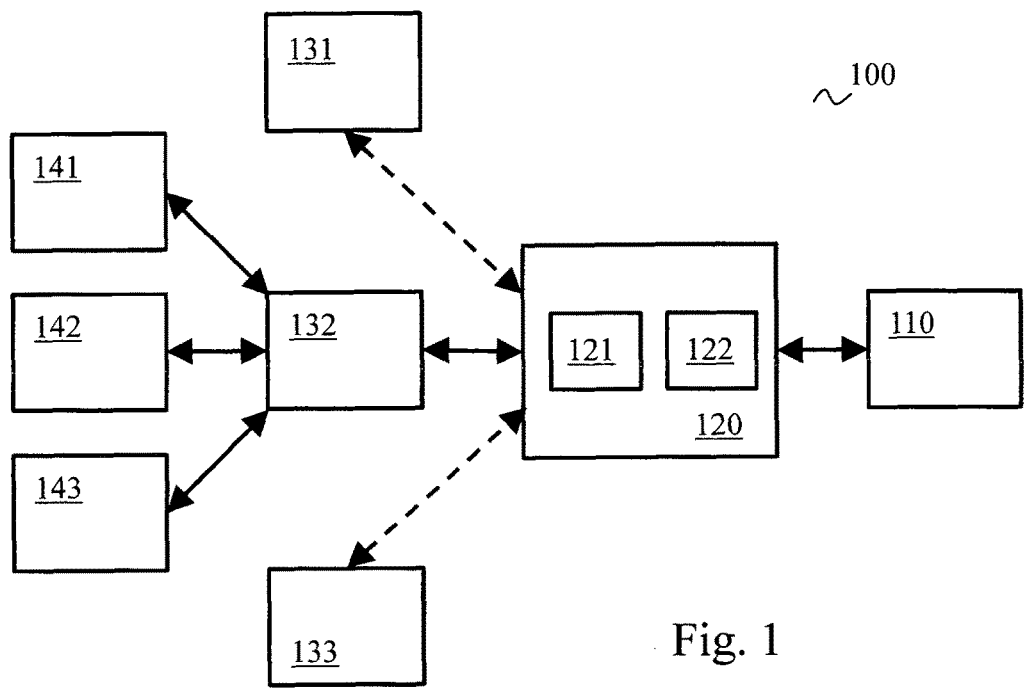

optical signals and the nominal wavelength of the optical band-pass filter.

12 Claims, 6 Drawing Sheets

(51) Int. Cl.
*H04B 10/272* (2013.01)
*H04J 14/02* (2006.01)

(52) U.S. Cl.
CPC ...... *H04J 14/0221* (2013.01); *H04J 14/0279* (2013.01); *H04J 14/0282* (2013.01)

(56) References Cited

FOREIGN PATENT DOCUMENTS

| | | |
|---|---|---|
| EP | 2 498 431 A1 | 9/2012 |
| EP | 2 621 112 A1 | 7/2013 |
| EP | 2 634 941 A1 | 9/2013 |
| EP | 2 634 942 A1 | 9/2013 |
| JP | 2000-68982 A | 3/2000 |
| JP | 2006-109443 A | 4/2006 |

\* cited by examiner

METHOD AND MONITORING DEVICE FOR DETERMINING EQUALIZATION PARAMETERS, COMPUTER PROGRAM, INFORMATION STORAGE MEANS

The present invention generally relates to optical networks and more particularly to configuring equalization parameters to be used to enable a receiver device to improve a processing of optical signals received from a transmitter device via an optical band-pass filter.

Optical networks, and more particularly passive optical networks, are increasingly used to give network access to residential or office gateways or to ensure mobile backhauling for instance.

In an attempt to increase the number of users to be served by one access system to the network, wavelength or frequency division multiplexing technologies have been developed. These technologies take advantage of multiplexing several optical signals using different carrier wavelengths or frequencies on a single optical fiber. Even though some user terminals may share the same carrier wavelength or frequency, a wavelength or frequency splitter is typically used to separate the different wavelengths, or frequencies, in order to increase the number of simultaneous optical transmissions. The wavelength or frequency splitter is typically placed between the user terminals and a terminal providing access to the rest of the network. For instance this latter terminal provides access to a core or metropolitan network. Different techniques can be used to achieve the wavelength or frequency splitting. We can cite thin films based systems, interference cavities as AWG (Array Wavelength Gratings) and FBG (Fiber Bragg Gratings).

The wavelength or frequency splitter then comprises several optical band-pass filters, for each direction of communications. It is used to filter and combine optical signals issued by the user terminals toward the terminal giving access to the core or metropolitan network. In the other direction, it is used to filter and spectrally split the optical signals issued by the terminal giving access to the core or metropolitan network.

The difficulty in such an arrangement is to configure the transmission interfaces of the terminals. Indeed, these transmission interfaces shall be configured so that the carrier wavelengths, or frequencies, effectively used substantially match the effective passband of the respective optical band-pass filters with which they are associated.

It is known that such wavelength or frequency splitters are used in a temperature-controlled environment. This allows insuring the stability of the passband of the optical band-pass filters. Otherwise, the passband would vary as a function of the temperature, especially the value of the nominal wavelength or frequency. This known technique however requires that the wavelength or frequency splitters be powered, or to be placed in an environment in which the temperature is controlled (e.g. air conditioned place) or in an athermanous (also referred to as athermal) package or in a package that controls the temperature of the device in a calibrated way. For flexibility in the network deployment, cost and maintenance considerations, it is desirable to get rid of this constraint, which means that the nominal wavelength or frequency of the frequency splitter is a priori unknown.

It can in addition be noticed that the terminals are also subject to similar variations of their transmission configurations, as a function of the temperature, when they are not in such temperature-controlled environments.

It can in addition be noticed that the terminals may also not be aware of the carrier wavelengths effectively used for given configurations of their respective transmission interfaces. Indeed, each terminal uses a set of configuration parameters that may not be indicative of the carrier wavelength effectively used. Modifying this set of configuration parameters involves modifying the carrier wavelength, but with no indication of the effective value of the carrier wavelength.

In order to improve decoding performance when receiving optical signals, equalization is typically performed in order to manage inter-symbol interference. However, as the transmission channel characteristics evolve with the temperature due to the potential mismatch between the carrier wavelength effectively used and the nominal wavelength of the frequency splitter, channel estimation shall be continuously or frequently performed, which requires numerous processing resources.

It is desirable to overcome the aforementioned problems which occur in optical networks. In particular, it is desirable to provide a solution that allows reducing an amount of processing resources needed to perform equalization in the scope of a transmission of optical signals on a carrier wavelength from a first device to a second device via an optical band-pass filter, said carrier wavelength and/or the passband of the optical band-pass filter being a priori unknown.

It is furthermore desirable to provide an efficient and cost-effective solution to the aforementioned problems.

To that end, the present invention concerns a method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The method is such that a monitoring device performs: determining information representative of a level of detuning between the carrier wavelength of the optical signals and the nominal wavelength of the optical band-pass filter; and determining said equalization parameters, on the basis of said determined information representative of the level of detuning between the carrier wavelength of the optical signals and the nominal wavelength of the optical band-pass filter. Thus, the level of detuning between the carrier wavelength of the optical signals and the nominal wavelength of the optical band-pass filter being representative of the transmission channel between the first device and the second device, the knowledge of such level of detuning allows determining appropriate equalization parameters without requiring to perform explicit channel estimation, more particularly although the transmission channel might significantly evolve due to temperature change.

According to a particular feature, the monitoring device performs: monitoring an evolution of the level of detuning between the carrier wavelength of the optical signals and the nominal wavelength of the optical band-pass filter; and determining whether a configuration of an optical transmission interface of the first device has to be adjusted so as to modify the carrier wavelength of the optical signals, on the basis of said monitoring. Thus, the configuration of the optical transmission interface of the first device can be adapted to improve the matching between the carrier wavelength of the optical signals and the nominal wavelength of the optical band-pass filter.

According to a particular feature, when the monitoring device determines that the configuration of an optical transmission interface of the first device has to be adjusted, the monitoring device performs: obtaining an estimation of what would be the level of detuning between the carrier wavelength of the optical signals and the nominal wavelength of the optical band-pass filter if the first device adjusts the configuration of the optical transmission interface of the first device so as to modify the carrier wavelength of the optical signals; determining said equalization parameters on the basis of said estimation; sending instructions to the first device for adjusting the configuration of the optical transmission interface of the first device so as to modify the carrier wavelength of the optical signals; and, sending instructions to the first device and/or the second device for applying the equalization parameters determined on the basis of said estimation. Thus, a proactive approach can be implemented to improve equalization.

According to a particular feature, when sending instructions for adjusting the configuration of the optical transmission interface of the first device and instructions for applying the equalization parameters, the monitoring device jointly transmits information representative of an instant at which said instructions shall be applied. Thus, the modification of the equalization parameters and the modification of the configuration of the optical transmission interface of the first device can be performed synchronously, which improves performance in decoding the optical signals.

According to a particular feature, for determining said equalization parameters, the monitoring device parses a look-up table matching predetermined equalization parameters with respective levels of detuning between the carrier wavelength of the optical signals and the nominal wavelength of the optical band-pass filter. Thus, the method is simple and cost-effective.

According to a particular feature, for beforehand filling in the look-up table, the monitoring device performs a learning phase by: obtaining channel estimation from learning phase optical signals transmitted by the first device to the second device via the optical pass-band filter; determining the equalization parameters to be filled in the look-up table from the obtained channel estimation; and determining the level of detuning, to be filled in the look-up table, between the carrier wavelength of the learning phase optical signals and the nominal wavelength of the optical band-pass filter. Furthermore, the monitoring device reiterates the learning phase for another carrier wavelength of the learning phase optical signals. Thus, the look-up table can be easily filled in.

According to a particular feature, for determining the information representative of said level of detuning, the monitoring device monitors an evolution of a difference level between codewords received by the second device via said optical signals and corresponding codewords transmitted by the first device. Thus, the detuning between the carrier wavelength of the optical signals and the nominal wavelength of the optical band-pass filter can be easily detected and tracked.

According to a particular feature, for determining the information representative of said level of detuning, the monitoring device performs: obtaining information representative of a signal temporal shape corresponding to a symbol of an optical signal received by the second device, from the first device, via the optical band-pass filter; and comparing the obtained information representative of the signal temporal shape with information representative of a set of predefined signal temporal shapes, each predefined signal temporal shape being representative of a respective level of detuning between the carrier wavelength of the optical signals and the nominal wavelength of the optical band-pass filter. Thus, the detuning between the carrier wavelength of the optical signals and the nominal wavelength of the optical band-pass filter can be easily detected and tracked, using another approach.

According to a particular feature, for determining the information representative of said level of detuning, the monitoring device obtains information representative of a time drift between successive symbols of an optical signal received by the second device, from the first device, via the optical band-pass filter. Thus, the detuning between the carrier wavelength of the optical signals and the nominal wavelength of the optical band-pass filter can be easily detected and tracked, using yet another approach.

According to a particular feature, for determining the information representative of said level of detuning, the monitoring device obtains information representative of variations of signal strength of the optical signal received by the second device. Thus, the detuning between the carrier wavelength of the optical signals and the nominal wavelength of the optical band-pass filter can be easily detected and tracked, using yet another approach, especially useful when transmittance of the optical band-pass filter smoothly evolves.

The present invention also concerns a monitoring device for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown. The monitoring device comprises: means for determining information representative of a level of detuning between the carrier wavelength of the optical signals and the nominal wavelength of the optical band-pass filter; and means for determining said equalization parameters, on the basis of said determined information representative of the level of detuning between the carrier wavelength of the optical signals and the nominal wavelength of the optical band-pass filter.

The present invention also concerns a computer program that can be downloaded from a communication network and/or stored on a medium that can be read by a processor. This computer program comprises instructions for implementing the aforementioned methods in any one of their various embodiments, when said program is run by the processor. The present invention also concerns an information storage means, storing such a computer program.

Figure 2:
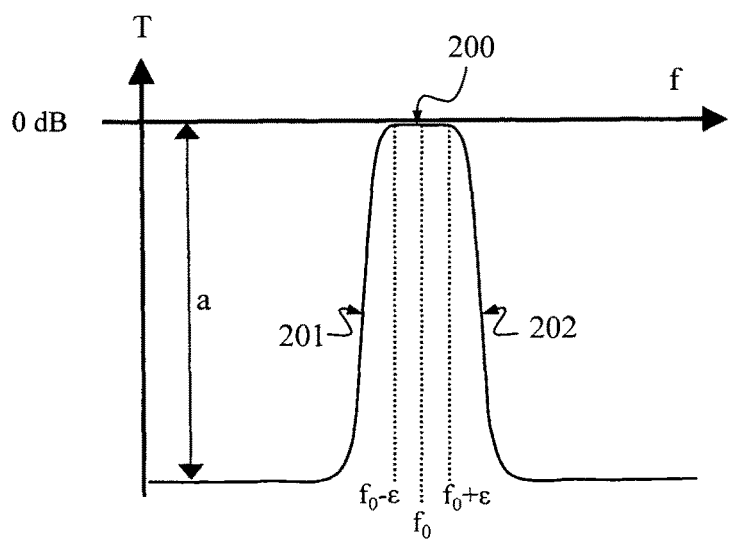
Figure 3:
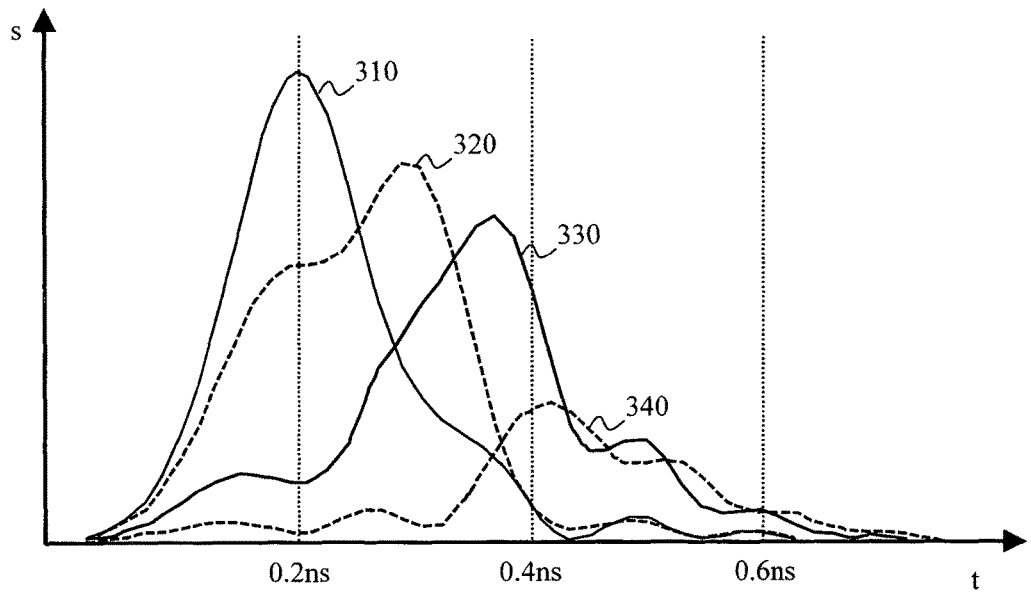
Figure 4:
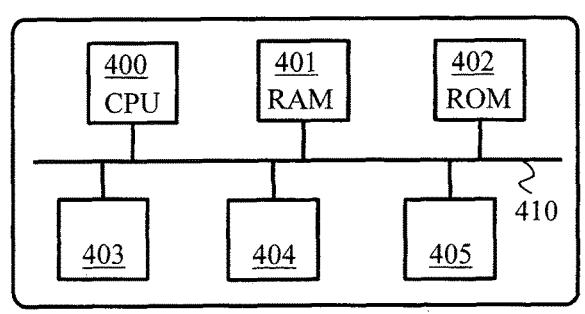
Figure 5:
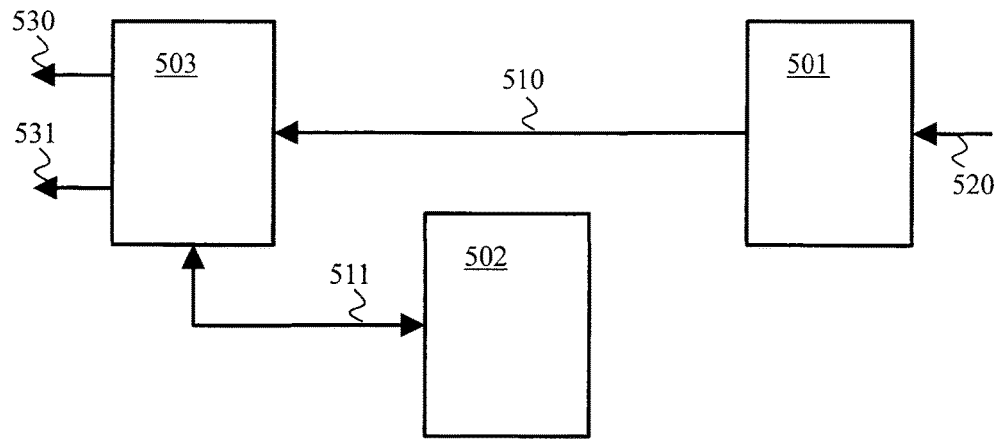
Figure 6:
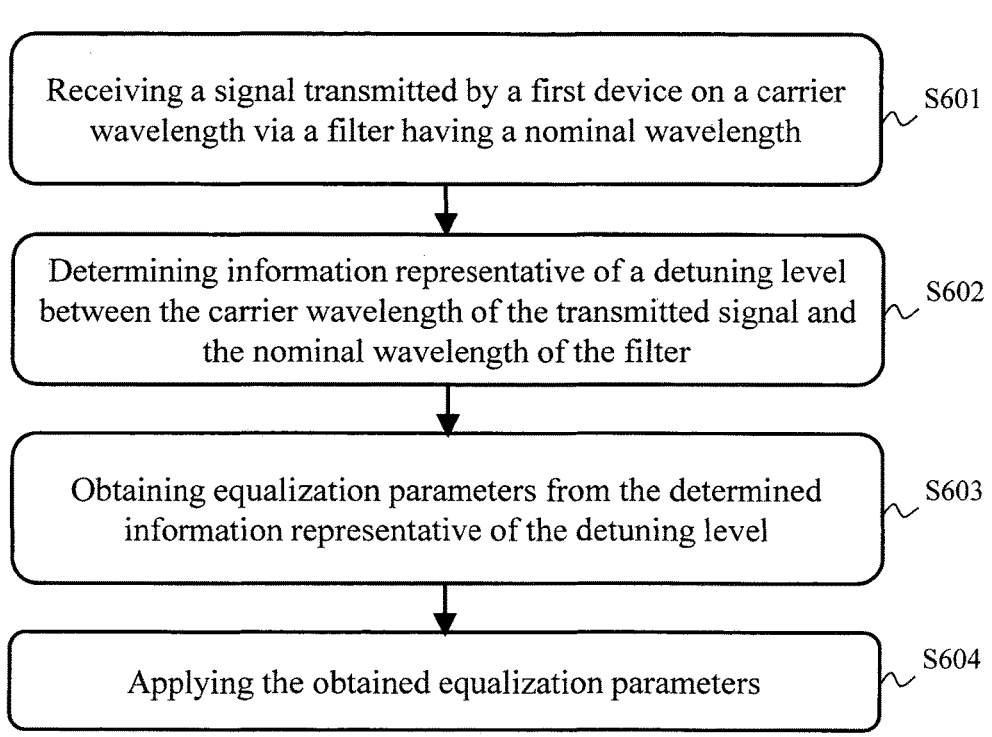
Figure 7:
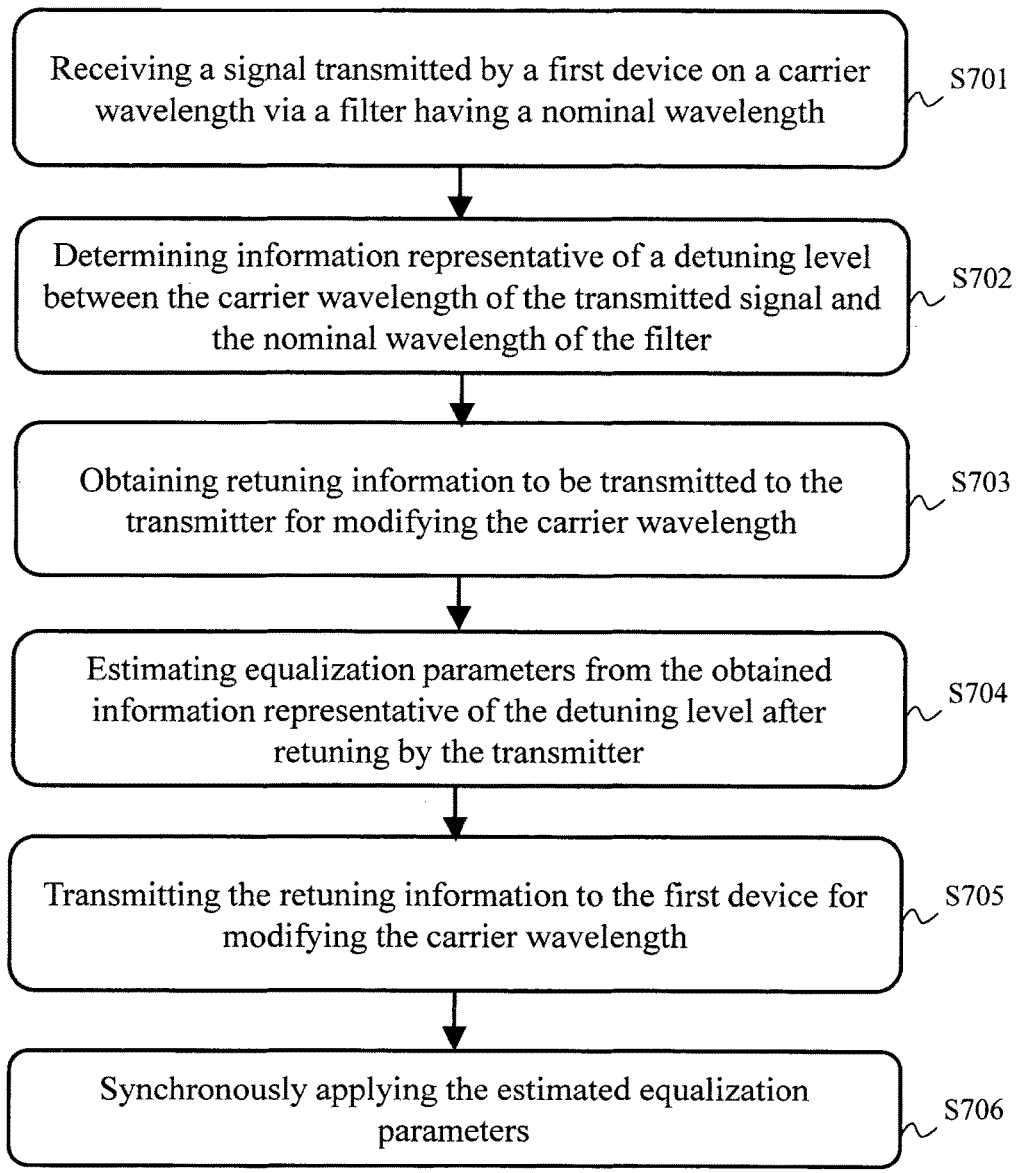
Figure 8:
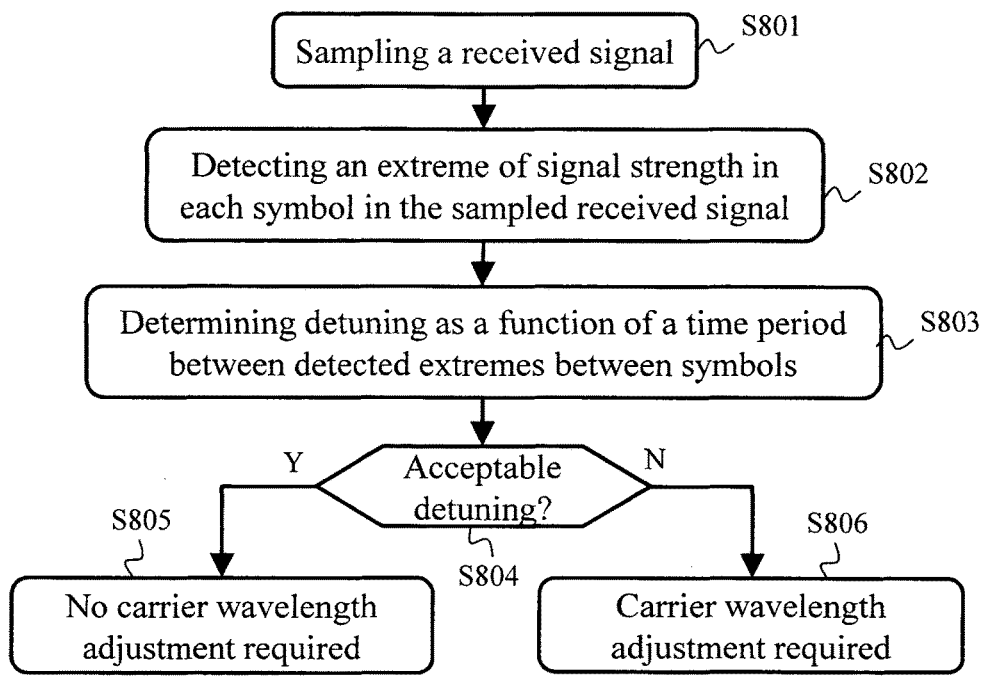
Figure 9:
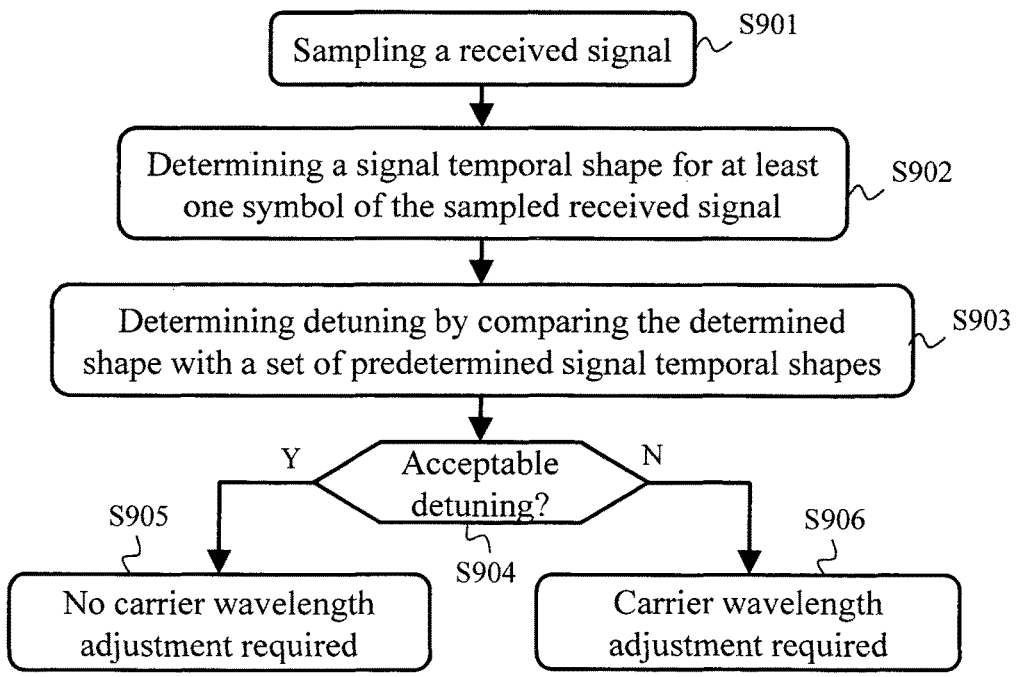
Figure 10:
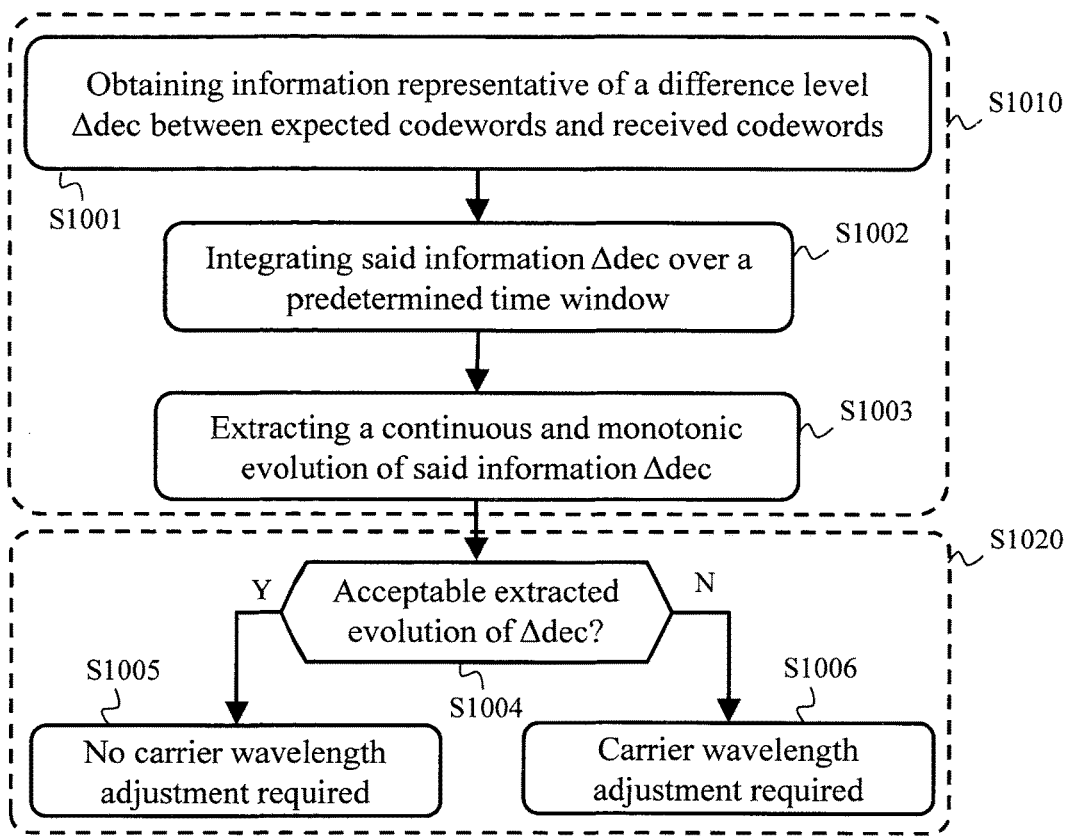
Figure 11:
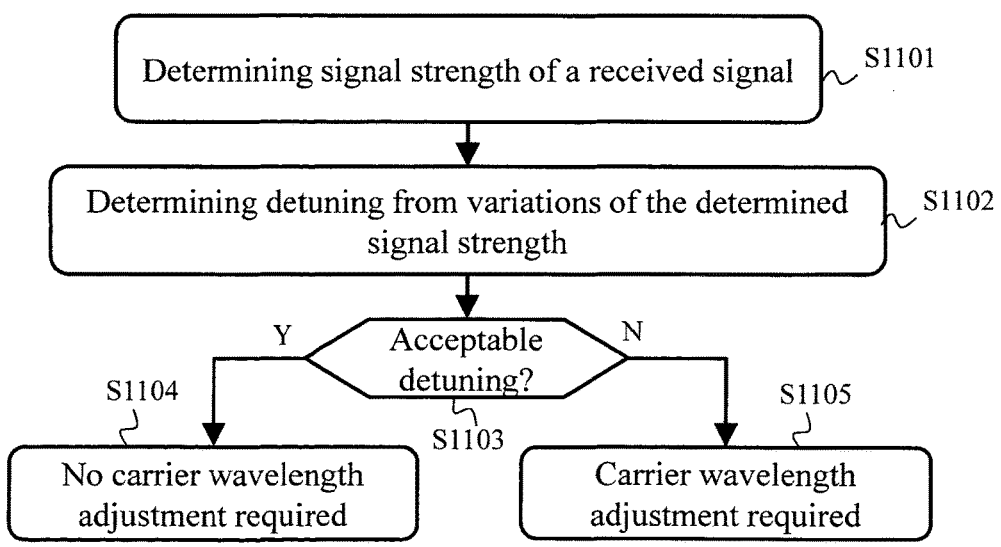

The characteristics of the invention will emerge more clearly from a reading of the following description of an example of embodiment, said description being produced with reference to the accompanying drawings, among which:

FIG. 1 schematically represents an architecture of a passive optical network in which the present invention may be implemented;

FIG. 2 schematically represents signal transmittance of an optical band-pass filter of the passive optical network;

FIG. 3 schematically represents signal temporal shapes corresponding to an impulse response of the optical band-pass filter;

FIG. 4 schematically represents a hardware platform of an optical communication device;

FIG. 5 schematically represents a partial modular architecture, either hardware or software, of a monitoring device;

FIG. 6 schematically represents a first algorithm, performed by the monitoring device, for configuring equalization parameters;

FIG. 7 schematically represents a second algorithm, performed by the monitoring device, for configuring equalization parameters;

FIG. 8 schematically represents a first algorithm for determining whether a configuration of an optical transmission interface has to be adjusted due to a temperature change;

FIG. 9 schematically represents a second algorithm for determining whether a configuration of an optical transmission interface has to be adjusted due to a temperature change;

FIG. 10 schematically represents a third algorithm for determining whether a configuration of an optical transmission interface has to be adjusted due to a temperature change; and FIG. 11 schematically represents a fourth algorithm for determining whether a configuration of an optical transmission interface has to be adjusted due to a temperature change.

The invention is detailed hereafter in the context of a passive optical network. It has to be however understood that the present invention is not limited to such a context, and may be implemented in the general scope of a transmission of optical signals from a first device to a second device via an optical band-pass filter, wherein the nominal wavelength of the optical band-pass filter and/or a carrier wavelength of the transmitted optical signals is a priori unknown.

It has to be noticed that, since wavelength and frequency are tied together through a direct inverse relationship, these two terms are indifferently used by the one skilled in the art, as they refer to the same concept.

FIG. 1 schematically represents an architecture of a passive optical network 100 in which the present invention may be implemented. The passive optical network 100 comprises a master device 110, a plurality of slave devices 141, 142, 143, and a spectral splitter device 120. The slave devices 141, 142, 143 are interconnected with the master device 110 via the spectral splitter device 120. Power splitters, as described hereafter, may be placed between the slave devices and the spectral filter device 120 in order to increase the number of slave devices that can be interconnected with the master device 110. All the interconnections of the passive optical network 100 are performed by using optical fiber.

In the context of the passive optical network 100, the slave devices 141, 142, 143 are of ONU (Optical Network Units) type. ONUs are typically intended to be located at the end-user household. In the context of the passive optical network 100, the master device 110 is of OLT (Optical Line Terminal) type. It enables ONUs to access a core or metropolitan network (not shown).

The slave devices 141, 142, 143 may be connected to the spectral splitter device 120 via a power splitter device 132. The power splitter device 132 is a passive splitter that separates the input signal, in the downlink direction, into a plurality of corresponding signals which power is divided by the number of links towards the slave devices 141, 142, 143. The signals output by the power splitter device 132, on each link in the downlink direction, contain the same information as the input signal, the power splitter device 132 having only impact on the power of the signals.

Other slave devices may be connected to the spectral splitter device 120 via power splitter devices 131, 133. Each power splitter device 131, 132, 133, and the slave devices connected to, form a network of PON (Passive Optical Network) type with the OLT. The PONs operate on respective wavelength bands, as filtered by the spectral splitter device 120. To achieve this, the spectral splitter device 120 comprises a pair of optical band-pass filters for each PON, aiming at filtering respective wavelength bands, and thus enabling the spectral splitter device 120 to perform WDM (Wavelength Division Multiplexing).

Therefore, as shown on FIG. 1, the spectral splitter device 120 comprises optical band-pass filters 121 and 122 dedicated to the transmissions over the PON of the power splitter device 132 and its associated slave devices 141, 142, 143. The first filter 122, called hereinafter uplink filter, is in charge of filtering the optical signals in the uplink direction, i.e. from the slave devices 141, 142, 143 to the master device 110. The second filter 121, called hereinafter downlink filter, is in charge of filtering the optical signals in the downlink direction, i.e. from the master device 110 to the slave devices 141, 142, 143. Each filter 121, 122 is an optical band-pass filter defined by a nominal wavelength, also referred to as centre wavelength, as well as a bandwidth or passband.

For a considered uplink or downlink direction, all the filters of the spectral splitter device 120 have preferably the same bandwidth value and are preferably spaced by a fixed spectral distance. However, the nominal wavelengths of the filters, and therefore the effective passband of the filters, are a priori unknown. The spectral splitter device 120 being preferably passive, the nominal wavelengths of the filters, and therefore the effective passband of the filters, may vary as a function of the temperature of the spectral splitter device 120. Typically, for a temperature in a range from −40° C. to 80° C., the nominal wavelength, and therefore the effective passband, may vary by ±0.6 nm for silica-based optical filters, which corresponds to a frequency shift over a frequency band of approximately 200 GHz.

In addition, for the same reasons, the effective carrier wavelength corresponding to a given configuration of the optical transmission interface of either a slave device 141, 142, 143 or the master device 110 may not be known.

Therefore, the slave devices 141, 142, 143 need to be configured for transmitting optical signals in the uplink direction on carrier frequencies that are in the bandwidth or passband of the uplink filter 122. In addition, the master device 110 needs to be configured for transmitting optical signals in the downlink direction on a carrier frequency that is in the bandwidth or passband of the downlink filter 121. Such configuration of the slave devices 141, 142, 143 and/or the master device 110 aims at retuning the carrier wavelength used to transmit optical signals by the concerned device. Beside the possible retuning of the carrier wavelength, the slave devices 141, 142, 143 and/or the master device 110 may be reconfigured by adequately defined equalization parameters. Such equalization is performed by the device receiving the optical signals (post-equalization) and/or by the device transmitting the optical signals (pre-equalization).

In order to determine which equalization parameters to apply in order to improve processing of optical signals transmitted on a carrier wavelength from a first device to a second device via an optical band-pass filter, the carrier wavelength and/or the passband of the optical band-pass filter being a priori unknown, it is proposed that a monitoring device determines information representative of a level of detuning between the carrier wavelength of the optical signals and the nominal wavelength of the optical band-pass filter, and determines said equalization parameters, on the basis of said determined information representative of the level of detuning between the carrier wavelength of the optical signals and the nominal wavelength of the optical band-pass filter. As the level of detuning between the carrier wavelength and the nominal wavelength of the optical band-pass filter is representative of the transmission channel between the first device and the second device, relying on said level of detuning to determine the equalization parameters is substantially more cost-effective. Moreover, the monitoring device is able to determine whether a configuration of an optical transmission interface of the first device used to transmit said optical signals has to be adjusted, by monitoring an evolution of said level of detuning. The monitoring device can then apply reactive of proactive mechanisms in order to adequately adjust the equalization parameters.

The monitoring device may be implemented in the second device, which receives the optical signals. In this case, when carrier wavelength retuning has to be performed, the second device sends instructions to the first device for reconfiguring accordingly its optical transmission interface, on the basis of said monitoring operation. When equalization is performed by the first device, the second device sends instructions to the first device for redefining accordingly the equalization parameters, on the basis of said monitoring operation and potentially on the basis of the instructions for retuning the optical transmission interface of the first device.

The monitoring device may, in a variant, be implemented in the first device, which transmits the optical signals. In this case, the second device provides the first device with information needed for determining in what magnitude the carrier wavelength used by the first device to transmit the optical signals is detuned with regard to the nominal wavelength of the optical band-pass filter. When equalization is performed by the second device, the first device sends instructions to the second device for redefining accordingly the equalization parameters, on the basis of said monitoring operation.

The monitoring device may in another variant be implemented in a third device, connected to the first device and second device. In this case, the second device provides the third device with information needed for determining in what magnitude the carrier wavelength used by the first device to transmit the optical signals is detuned with regard to the nominal wavelength of the optical band-pass filter, and the third device determines accordingly whether the optical transmission interface of the first device has to be adjusted. When carrier wavelength retuning has to be performed, the third device sends instructions to the first device for reconfiguring accordingly its optical transmission interface, on the basis of said monitoring operation. When equalization is performed by the first device, the third device sends instructions to the first device for redefining accordingly the equalization parameters, on the basis of said monitoring operation and potentially on the basis of the instructions for retuning the optical transmission interface of the first device. When equalization is performed by the second device, the third device sends instructions to the second device for redefining accordingly the equalization parameters, on the basis of said monitoring operation and potentially on the basis of the instructions for retuning the optical transmission interface of the first device.

In the context of the passive optical network 100, the monitoring device may be implemented in the master device 110 for monitoring downlink and uplink optical transmissions. In yet another variant, the monitoring device may be implemented in the slave devices 141, 142, 143 for monitoring downlink and uplink optical transmissions.

When the monitoring device instructs the first device to effectively adjust the configuration of its optical transmission interface, the monitoring device is referred herein to as configuring device.

FIG. 2 schematically represents a signal transmittance (denoted a on FIG. 2) of an optical band-pass filter of the passive optical network. Frequency is represented as abscissa (horizontal axis) and transmittance (denoted T on FIG. 2) is represented as ordinate (vertical axis).

The passband of the optical band-pass filter is centred at the nominal frequency $f_0$, which is a priori unknown and which may vary as a function of the temperature. FIG. 2 shows a flat top 200 between the low cut-off frequency $f_0-\epsilon$ and the high cut-off frequency $f_0+\epsilon$, the width of the flat top being equal to $2\epsilon$. Between the low cut-off frequency $f_0-\epsilon$ and the high cut-off frequency $f_0+\epsilon$, it can be considered that no signal attenuation occurs.

FIG. 2 shows a rising edge 201 for frequencies lower than the low cut-off frequency $f_0-\epsilon$ and a falling edge 202 for frequencies higher than the high cut-off frequency $f_0+\epsilon$. For flat-top filters, the slopes of the rising edge and of the falling edge are abrupt, which means that attenuation may vary from minimum to maximum within a short frequency range. It is considered that a slope of the rising edge and of the falling edge is abrupt when the absolute value of the slope has a magnitude of at least 500 dB/nm.

Therefore, when a carrier frequency of an optical signal is in the frequency range of the flat-top 200, no attenuation of the signal occurs. But when the carrier frequency of the optical signal is close to the low cut-off frequency $f_0-\epsilon$ or to the high cut-off frequency $f_0+\epsilon$, a slight variation of temperature may imply a slight frequency shift, which then may imply a significant change in attenuation of the optical signal. However, even in the frequency range of the flat-top 200, a slight frequency shift may imply a change of phase or delay group in the received optical signals which necessitates an adjustment of the equalization parameters.

FIG. 3 schematically represents signal temporal shapes of an impulse response of the optical band-pass filter present on the optical path from the first device to the second device. Time is represented as abscissa (horizontal axis) and signal strength is represented as ordinate (vertical axis).

Let's consider an optical band-pass filter having the following characteristics: an attenuation of 0.1 dB at 10 GHz, an attenuation of 3 dB at 7.5 GHz and 12.5 GHz, and slopes of 850 dB/nm beyond these values.

On FIG. 3, a shape 310 represents the signal temporal shape of the impulse response of the optical band-pass filter, when the carrier frequency of the optical signal matches the nominal frequency $f_0$ of the optical band-pass filter. The shape 310 shows an extreme around 0.2 ns from the beginning of the symbol reception.

On FIG. 3, a shape 320 represents the signal temporal shape of the impulse response of the optical band-pass filter, when the frequency shift between the carrier frequency of the optical signal and the nominal frequency $f_0$ of the optical band-pass filter equals to 2 GHz. The shape 320 shows an extreme around 0.3 ns from the beginning of the symbol reception.

On FIG. 3, a shape 330 represents the signal temporal shape of the impulse response of the optical band-pass filter, when the frequency shift between the carrier frequency of the optical signal and the nominal frequency $f_0$ of the optical band-pass filter equals to 4 GHz. The shape 330 shows an extreme around 0.35 ns from the beginning of the symbol reception.

On FIG. 3, a shape 340 represents the signal temporal shape of the impulse response of the optical band-pass filter, when the frequency shift between the carrier frequency of the optical signal and the nominal frequency $f_0$ of the optical band-pass filter equals to 6 GHz. The shape 340 shows an extreme around 0.4 ns from the beginning of the symbol reception.

The shapes 310, 320, 330 and 340 show extremes, which are maximum signal strength, around respectively 0.3 ns, 0.35 ns and 0.4 ns. Other shapes may be obtained, for instance according to the waveform of the signal transmitted via the optical band-pass filter. Such shapes may present more extremes, also referred to as local extremes, as shown for instance in shapes 330 and 340.

It can then be understood that the signal temporal shape varies with the frequency detuning between the carrier frequency of the transmitted optical signal and the nominal frequency $f_0$ of the optical band-pass filter.

FIG. 4 schematically represents a hardware platform of the device that includes the monitoring device.

According to the shown hardware platform, the monitoring device comprises the following components interconnected by a communications bus 410: a processor, microprocessor, microcontroller or CPU (Central Processing Unit) 400; a RAM (Random-Access Memory) 401; a ROM (Read-Only Memory) 402; a device 403 adapted to read information stored on storage means, such as an HDD (Hard-Disk Drive) or an SD (Secure Digital) card reader; at least one communication interface 404, for transmitting signals and information to and/or receiving signals and information from other devices of the passive optical network.

CPU 400 is capable of executing instructions loaded into RAM 401 from ROM 402 or from any other storage means. After the monitoring device has been powered on, CPU 400 is capable of reading instructions from RAM 401 and executing these instructions. The instructions form one computer program that causes CPU 400 to perform some or all of the steps of algorithms described hereafter, and/or to implement a modular architecture described hereafter with regard to FIG. 5.

Any and all steps of the algorithms described herein, as well as the modular architecture shown in FIG. 5, may be implemented in software by execution of a set of instructions or program by a programmable computing machine, such as a DSP (Digital Signal Processor) or a microcontroller; or else be implemented in hardware by a machine or a dedicated component, such as an FPGA (Field-Programmable Gate Array) or an ASIC (Application-Specific Integrated Circuit).

FIG. 5 schematically represents a partial modular architecture, either hardware or software, that may be implemented by the monitoring device in the present invention.

According to the shown modular architecture, the monitoring device comprises a first module 501 for determining detuning information, a second module 502 for determining equalization parameters and a third module 503 for configuring the first device and/or the second device.

The first module 501 for determining detuning information is adapted to receive and process information provided by the second device via a link 520 connecting the monitoring device to the second device. Said information provided by the second device is representative of signal strength measurements performed by the second device when receiving optical signals from the first device via the optical band-pass filter, or, said information provided by the second device is representative of a variation of such signal strength, or said information provided by the second device is representative of a difference level Δdec between codewords received by the second device via said optical signals and corresponding codewords transmitted by the first device. From the information provided by the second device, the monitoring device is able to determine a first detuning information representative of a detuning between the carrier wavelength of the optical signals transmitted by the first device to the second device via the optical band-pass filter and the nominal wavelength of the optical band-pass filter. Details about determining the first detuning information from information representative of signal strength measurements performed by the second device when receiving optical signals from the first device via the optical band-pass filter, or from variations thereof, or from information representative of a difference level Δdec between codewords received by the second device via said optical signals and corresponding codewords transmitted by the first device, are presented hereafter with regard to FIGS. 8 to 11.

The difference level Δdec is for instance expressed as an Euclidian distance between the transmitted codeword and the received codeword. Results of soft decoding can be used to do so. The difference level Δdec may also be expressed as a bit error rate (BER), or as any metric representative of the difficulty encountered by the second device to recover the transmitted codewords.

The third module 503 for configuring the first device and/or the second device is adapted to process the first detuning information determined by the first module 501. The first detuning information is provided by the first module 501 to the third module 503 via a link 510. The third module 503 is adapted to determine from the first detuning information whether there is a need for adjusting the optical transmission interface of the first device in order to improve the matching of the carrier wavelength used by the first device to transmit the optical signals to the second device via the optical band-pass filter and the nominal wavelength of the optical band-pass filter. The third module 503 determines whether the detuning information is representative of an acceptable detuning between the carrier wavelength used by the first device to transmit the optical signals to the second device via the optical band-pass filter and the nominal wavelength of the optical band-pass filter. Determining whether said detuning is acceptable is detailed hereafter with regard to FIGS. 8 to 11.

The third module 503 is further adapted to provide second detuning information to the second module 502. The second detuning information is the first detuning information, as provided by the first module 501, when no adjustment of the configuration of the optical transmission interface of the first device is performed. The second detuning information is derived from the first detuning information, as provided by the first module 501, when adjustment of the configuration of the optical transmission interface of the first device is performed. Indeed, when adjustment of the optical transmission interface of the first device is performed, the third module 503 determines, from the first detuning information, an estimate of what would become the effective detuning between the carrier wavelength used by the first device to transmit the optical signals to the second device via the optical band-pass filter and the nominal wavelength of the optical band-pass filter after having adjusted the configuration of the optical transmission interface of the first device. In this case, the second detuning information is such estimate.

The second module 502 for determining equalization parameters is adapted to receive the second detuning information from the third module 503 via a link 511. The equalization parameters to be applied are preferably stored in a LUT (Look-Up Table) in correspondence with information about detuning between the carrier wavelength used by the first device to transmit the optical signals to the second device via the optical band-pass filter and the nominal wavelength of the optical band-pass filter. The second module 502 is therefore adapted to parse the LUT and retrieve in the LUT the equalization parameters that match the second detuning information provided by the third module 503. The second module 502 is further adapted to provide the retrieved equalization parameters to the third module 503 via the link 511.

The LUT providing matching information between equalization parameters and detuning information is filled in beforehand thanks to learning phases. During each learning phase, the second device performs channel estimation or provides to the monitoring device information needed to perform channel estimation. Channel estimation is performed upon receiving learning phase optical signals and enables determining equalization parameters to attempt to reverse distortion incurred by the optical signals transmitted by the first device to the second device via the optical band-pass filter. At the same time, the monitoring device determines information representative of a level of possible detuning between the carrier wavelength of said learning phase optical signals and the nominal wavelength of the optical band-pass filter. Details about determining such detuning information from information representative of signal strength measurements performed by the second device when receiving optical signals from the first device via the optical band-pass filter, or from information representative of signal strength variations thereof, or from information representative of a difference level Δdec between codewords received by the second device via said optical signals and corresponding codewords transmitted by the first device, are presented hereafter with regard to FIGS. 8 to 11. Using various configurations of the optical transmission interface allows associating information representative of detuning level with respective equalization parameters that are applicable when such detuning level occurs. The monitoring device therefore fills in the LUT with the determined equalization parameters and the determined respective level of detuning between the carrier wavelength of the learning phase optical signals and the nominal wavelength of the optical band-pass filter, and reiterates the learning phase after having instructed the first device to modify the configuration of the optical transmission interface of the first device so as to modify the carrier wavelength in use.

The third module 503 is further adapted to send instructions to the first device for adjusting, when needed, the configuration of the optical transmission interface of the first device in order to improve the matching of the carrier wavelength used by the first device to transmit the optical signals to the second device via the optical band-pass filter and the nominal wavelength of the optical band-pass filter. Said instructions are sent by the third module 503 via a link 530 connecting the monitoring device to the first device.

The third module 503 is further adapted to send to the first device and/or the second device equalization parameters to be applied. The third module 503 sends said equalization parameters via a link 531. When the configuration of the optical transmission interface of the first device has to be adjusted, the third module 503 ensures that the application of the equalization parameters is synchronous with the change in the configuration of the optical transmission interface of the first device. When equalization is performed by the first device, the synchronous application of the equalization parameters is straight-forward; when equalization is performed by the second device, the third module 503 may notify to both the first device and the second device at which instant the change in equalization parameters and in the configuration of the optical transmission interface of the first device has to be applied. Such an approach supposes that the first device, the second device and the monitoring device share a common reference clock. In a variant, when the first device and the second device receive instructions to change the equalization parameters and the configuration of the optical transmission interface of the first device, the first device and the second device apply such change at the beginning of a predetermined symbols frame. Said symbols frame is predetermined as a function of an instant at which said instructions are received by the first and second devices, e.g. the beginning of the symbols frame that immediately follows the reception of said instructions.

In one embodiment, the monitoring device adapts the equalization parameters only in view of the detuning information determined by the first module 501. In other words, the monitoring device doesn't try to estimate what would become the detuning information after a change of the configuration of the optical transmission interface of the first device, and doesn't attempt to anticipate what should be the equalization parameters at that time. Instead of adapting the equalization in a proactive fashion, the monitoring device thus adapts the equalization parameters in a reactive way. In this case, the second detuning information provided by the third module 503 to the second module 502 is always the same as the first detuning information provided by the first module 501 to the third module 503. The second module 502 may also receive the first detuning information directly from the first module 501.

FIG. 6 schematically represents a first algorithm for configuring equalization parameters. The algorithm of FIG. 6 details the behaviour of the monitoring device in the aforementioned case where the monitoring device adapts the equalization in a reactive fashion.

In a step S601, the second device receives an optical signal transmitted by the first device on a carrier wavelength, via the optical band-pass filter. The second device performs signal strength measurements when receiving the optical signal from the first device via the optical band-pass filter, or determines a difference level Δdec between codewords received by the second device via said optical signals and corresponding codewords transmitted by the first device. The second device then sends to the monitoring device information representative of said signal strength measurements or variations of said signal strength or representative of said difference level Δdec.

In a following step S602, the monitoring device determines, from the information provided by the second device, information representative of a level of detuning between the carrier wavelength and the nominal wavelength of the optical band-pass filter.

In a following step S603, the monitoring device obtains equalization parameters from the information representative of a level of detuning obtained in the step S602. The equalization parameters result from the aforementioned channel learning phase during which the matching between equalization parameters and level of detuning between the carrier wavelength and the nominal wavelength of the optical band-pass filter is learnt.

In a following step S604, the monitoring device sends instructions to the first device and/or to the second device for applying the equalization parameters obtained in the step S603. Thus, equalization is improved by reactively adapting the equalization parameters to new transmission conditions without performing channel estimation.

FIG. 7 schematically represents a second algorithm for configuring equalization parameters. The algorithm of FIG. 7 details the behaviour of the monitoring device in the aforementioned case where the monitoring device adapts the equalization in a proactive fashion.

In a step S701, the second device receives an optical signal transmitted by the first device on a carrier wavelength, via the optical band-pass filter. The second device performs signal strength measurements when receiving the optical signal from the first device via the optical band-pass filter, or determines a difference level Δdec between codewords received by the second device via said optical signals and corresponding codewords transmitted by the first device. The second device then sends to the monitoring device information representative of said signal strength measurements or representative of variations thereof or representative of said difference level Δdec.

In a following step S702, the monitoring device determines, from the information provided by the second device, information representative of a level of detuning between the carrier wavelength and the nominal wavelength of the optical band-pass filter.

In a following step S703, the monitoring device obtains retuning information for adjusting the configuration of the optical transmission interface of the first device in order to improve the matching of the carrier wavelength used by the first device to transmit the optical signals to the second device via the optical band-pass filter and the nominal wavelength of the optical band-pass filter. The monitoring device then determines an estimate of what would become the effective detuning between the carrier wavelength used by the first device to transmit the optical signals to the second device via the optical band-pass filter and the nominal wavelength of the optical band-pass filter after having adjusted the configuration of the optical transmission interface of the first device.

In a following step S704, the monitoring device obtains equalization parameters from the information representative of a level of detuning estimated in the step S704. The equalization parameters result from the aforementioned channel learning phase during which the matching between equalization parameters and level of detuning between the carrier wavelength and the nominal wavelength of the optical band-pass filter is learnt.

In a following step S705, the monitoring device in its role of configuring device sends instructions to the first device for adjusting the configuration of the optical transmission interface of the first device in order to improve the matching of the carrier wavelength used by the first device to transmit the optical signals to the second device via the optical band-pass filter and the nominal wavelength of the optical band-pass filter.

In a following step S706, the monitoring device sends instructions to the first device and/or to the second device for applying the equalization parameters obtained in the step S704. As already mentioned, applying the equalization parameters is preferably performed synchronously with applying the change in the configuration of the optical transmission interface of the first device. To do so, the monitoring device transmits jointly, with said instructions of the steps S705 and S706, information representative of an instant at which said instructions shall be applied. In a variant, the instant at which the instructions shall be applied is determined according to a predefined scheme, e.g. be applied from a predetermined data frame, which is for instance the next data frame after reception of said instructions. Thus, equalization is improved by proactively adapting the equalization parameters to new transmission conditions without performing channel estimation.

FIG. 8 schematically represents a first algorithm for determining whether the configuration of the optical transmission interface of the first device has to be adjusted.

In a step S801, the second device samples an optical signal received from the first device via the optical band-pass filter.

In a following step S802, the second device detects extremes of signal strength in at least two successive symbols of the optical signal. In a particular embodiment, the second device detects at least one extreme of signal strength in each symbol of the optical signal. See FIG. 3 for details about such extremes. The second device then determines instants at which said extremes occur.

In a following step S803, the second device determines time periods between detected extremes of signal strength between successive symbols of the optical signal received from the first device via the optical band-pass filter. In a variant, the step S803 is performed by the monitoring device, on the basis of information provided by the second device indicating the instants at which said extremes occur.

In a particular embodiment, the detected extremes are the signal strength maximum values for the respective symbols.

Then, the second device, or the monitoring device, determines whether a time drift exists between the occurrences of the extremes of signal strength. Such a time drift is representative of a detuning, compared to a preceding configuration, between the carrier wavelength used to transmit the optical signals and the nominal wavelength of the optical band-pass filter. To achieve this, the second device, or the monitoring device, checks whether the time periods between the occurrences of the extremes of signal strength are stable or not, by comparing said time periods. At least three successive symbols are therefore needed in order to obtain at least two periods between occurrences of signal strength extremes for the comparison. Two successive symbols are however sufficient to determine whether a time drift exists, when the time period between said occurrences of the extremes of signal strength in the signal as transmitted by the first device is a priori known.

When the time periods between occurrences of signal strength extremes are stable, it means that there is no variation between the carrier frequency of the optical signal and the nominal frequency of the optical band-pass filter. When these time periods decrease over time, it means that the carrier frequency of the optical signal gets closer to the nominal frequency of the optical band-pass filter. When these time periods increase over time, it means that the carrier frequency of the optical signal gets further from the nominal frequency of the optical band-pass filter.

In one embodiment, the second device determines whether a time drift exists between the occurrences of the extremes of signal strength, and provides an information of such a time drift to the monitoring device.

In other words, in the step S803, the monitoring device obtains information representative of a time drift between successive symbols of the optical signal. The monitoring device obtains such information directly from the second device, or from information representative of the aforementioned time periods provided by the second device, or from information representative of the aforementioned instants at which extremes are detected by the second device.

In a following step S804, the monitoring device checks whether the detected time drift is representative of an acceptable detuning between the carrier wavelength used to transmit the optical signals and the nominal wavelength of the optical band-pass filter, and accordingly determines whether the configuration of the optical transmission interface of the first device has to be adjusted.

In a preferred embodiment, the configuration of the optical transmission interface of the first device has to be adjusted when the time drift shows a time period increase between extremes of signal strength. It means that if the time drift shows a time period decrease between extremes of signal strength, no adjustment of the configuration of the optical transmission interface of the first device may be performed, as it means that the carrier wavelength of the optical signal gets closer to the nominal wavelength of the optical band-pass filter. If it is detected that the time drift shows such time period increase, a step S806 is performed; otherwise, a step S805 is performed. In the step S805, the monitoring device determines that the configuration of the optical transmission interface of the first device doesn't need to be adjusted; whereas, in the step S806, the monitoring device determines that the configuration of the optical transmission interface of the first device has to be adjusted.

Following the step S806, the monitoring device, in its role of configuring device, sends instructions to the first device for adjusting the configuration of the optical transmission interface of the first device. As the monitoring device may not be aware whether the carrier frequency should be increased or decreased, the monitoring device may indicate a default direction in which the carrier frequency should be tuned. Then, once the first device has modified the configuration of its optical transmission interface, the monitoring device checks whether a time drift occurs in the appropriate direction, i.e. the time periods between extremes of signal strength of successive symbols decrease. If not, the monitoring device sends instructions to the first device for adjusting the configuration of the optical transmission interface of the first device in the other direction.

In order to detect the extremes of signal strength in the symbols of the optical signal, the second device performs oversampling in the step S801.

In a variant, the first device successively transmits plural copies of plural symbols, each copy being delayed from the preceding copy by a submultiple of the symbol duration. This delay can be achieved by using delay lines. Then, the second device performs sampling of the plural copies and the second device detects at least one extreme of signal strength among said plural copies for each symbol. According to this arrangement, time period between the beginning of the transmission of a copy and the beginning of the transmission of the immediately following copy equals to a symbol duration increased by said submultiple of the symbol duration. Therefore, the second device samples the copies of a same symbol at different instants and therefore catches the signal strength at different instants, which allows obtaining a discrete view of the signal temporal shape for the symbol without using oversampling.

In another variant, the first device successively transmits plural copies of plural symbols. Then, the second device performs sampling of the plural copies, each sampling operation for one copy being delayed compared to the sampling operation of a preceding copy by a submultiple of the symbol duration. This delay can be achieved by using delay lines. According to this arrangement too, the second device samples the copies of a same symbol at different instants and therefore catches the signal strength at different instants, which allows obtaining a discrete view of the signal temporal shape for the symbol without using oversampling.

In the last two variants, the second device may transmit to the monitoring device information indicating, among a sequence of symbol copies, the index of the copy containing the extreme of signal strength detected by the second device. By transmitting this index, the monitoring device being aware of the number of copies per sequence and being aware of the delay applicable between each couple of copies, the monitoring device is able to determine at which instant the extreme occurred. This allows limiting the amount of information exchanged between the second device and the monitoring device, thus reducing the transmission resource consumption.

FIG. 9 schematically represents a second algorithm for determining whether the configuration of the optical transmission interface of the first device has to be adjusted.

In a step S901, the second device samples an optical signal received from the first device via the optical band-pass filter. In a following step S902, the second device determines information representative of a signal temporal shape corresponding to one symbol of the sampled optical signal.

According to one embodiment, in order to determine such information, the second device obtains measurements of the signal strength of the optical signal received by the second device, from the first device via the optical band-pass filter, at plural instants in the duration of the symbol. It means that the second device measures, for the symbol, the signal strength at different instants. Then the second device transmits to the monitoring device information representative of said measurements.

According to another embodiment, in order to determine such information, the second device obtains measurements of the signal strength of the optical signal received by the second device, from the first device via the optical band-pass filter, at plural instants in the duration of the symbol. The second device then determines local extremes or inflection points in the measurements of the signal strength, and transmits to the monitoring device information representative of said local extremes or inflection points. See FIG. 3 for details about such local extremes. Such local extremes or inflection points in the signal temporal shape may for instance be determined on the basis respectively of the derivative of the signal temporal shape and of the second derivative of the signal temporal shape.

The monitoring device therefore obtains information representative of the signal temporal shape for the symbol.

In order to obtain measurements of the signal strength at plural instants in the duration of the symbol, the second device performs oversampling in the step S901.

In a variant, the first device successively transmits plural copies of the symbol, each copy being delayed from the preceding copy by a submultiple of the symbol duration. This delay can be achieved by using delay lines. Then, the second device performs sampling of the plural copies and the second device performs one measurement of signal strength for each copy of the symbol, according to its sampling frequency. According to this arrangement, the time period between the beginning of the transmission of a copy and the beginning of the transmission of the immediately following copy equals to a symbol duration increased by said submultiple of the symbol duration. Therefore, the second device samples the copies of a same symbol at different instants and therefore catches the signal strength at different instants, which allows obtaining a discrete view of the signal temporal shape for the symbol without using oversampling. The second device then generates information representative of the signal temporal shape from the sampling of the plural copies.

In another variant, the first device successively transmits plural copies of the symbol. Then, the second device performs sampling of the plural copies, each sampling operation for one copy being delayed compared to the sampling operation of a preceding copy by a submultiple of the symbol duration. This delay can be achieved by using delay lines. According to this arrangement too, the second device samples the copies of a same symbol at different instants and therefore catches the signal strength at different instants, which allows obtaining a discrete view of the signal temporal shape for the symbol without using oversampling. The second device then generates information representative of the signal temporal shape from the sampling of the plural copies.

In a following step S903, the monitoring device compares the determined signal temporal shape with a set of predefined signal temporal shapes. In other words, using the illustrative example of FIG. 3, the monitoring device has at its disposal information representative of various candidate signal temporal shapes corresponding to the shapes 310, 320, 330, 340, which may be observed by the second device when receiving the symbol. The information representative of the various candidate signal temporal shapes are actually representative of a convolution of the temporal shape of the impulse response of the optical band-pass filter shown in FIG. 3 with the waveform actually used by the first device to transmit the optical signal to the second device.

The monitoring device determines which predefined candidate shape best matches the actual observation performed by the second device when receiving the symbol. As shown in FIG. 3, knowing the signal temporal shape for the received symbol, the frequency shift between the nominal frequency of the optical band-pass filter and the actual carrier frequency of the optical signal transmitted by the first device to the second device may be deduced. Such candidate shapes are for instance patterns stored in an LUT in correspondence with the frequency shift between said nominal frequency and said carrier frequency.

Selecting the predefined candidate shape that best matches the actual observation performed by the second device is for instance performed as follows. The monitoring device having values of the actual signal strength at predefined time intervals in the symbol duration, the monitoring device compares the actual signal strength for one interval with the signal strength estimated for the candidate shapes for the same interval. The monitoring device then selects the subset of candidate shapes for which the estimated signal strength value matches the actual signal strength for this interval, and reiterates the selection process for another interval for the selected candidate shapes, until only one candidate shape remains.

Selecting the predefined candidate shape that best matches the actual observation performed by the second device may also be performed by comparing local extremes or inflection points of the actual observation performed by the second device with local extremes or inflection points of the candidate shapes.

In a following step S904, the monitoring device checks whether there is a frequency shift between the nominal frequency of the optical band-pass filter and the actual carrier frequency of the optical signal transmitted by the first device to the second device. In other words, referring to FIG. 3, if the actual signal temporal shape for the received symbol corresponds to the shape 310, there is no frequency shift and a step S905 is performed, in which the monitoring device determines that the configuration of the optical transmission interface of the first device doesn't need to be adjusted. Otherwise, if the actual signal temporal shape for the received symbol corresponds to either the shape 320, 330 or 340, there is some frequency shift and a step S906 is performed, in which frequency adjustment is requested.

Then, in the step S906, the monitoring device determines that the configuration of the optical transmission interface of the first device has to be adjusted. The monitoring device may determine the extent to which the configuration of the optical transmission interface of the first device needs to be adjusted thanks to the magnitude of the frequency shift, between the carrier frequency and the nominal frequency of the optical band-pass filter, corresponding to said candidate shape. This information may be taken into account when adjusting the configuration of the optical transmission interface of the first device.

The monitoring device may also decide that some frequency shift, below a predefined threshold, is acceptable. In this case, referring again to FIG. 3, if the actual signal temporal shape for the received symbol matches either the shape 310 or 320, the step S905 is performed, and otherwise, the step S906 is performed. In other words, the monitoring device checks whether the detected frequency shift is representative of an acceptable detuning between the carrier wavelength used to transmit the optical signals and the nominal wavelength of the optical band-pass filter, and accordingly determines whether the configuration of the optical transmission interface of the first device has to be adjusted.

Following the step S906, the monitoring device in its role of configuring device sends instructions to the first device for adjusting the configuration of its optical transmission interface. As the monitoring device may not be aware whether the carrier frequency should be increased or decreased, the monitoring device may indicate a default direction in which the carrier frequency should be tuned. Then, once the first device has modified the configuration of its optical transmission interface, the monitoring device checks whether the signal temporal shape for a following symbol shows an adjustment in the appropriate direction. If not, the monitoring device sends instructions to the first device for adjusting the configuration of its optical transmission interface in the other direction.

In a particular embodiment, when the monitoring device is not aware whether the carrier frequency should be increased or decreased, the monitoring device requests firstly a partial adjustment of the configuration of the optical transmission interface of the first device. Then, according to the signal temporal shape for the considered following symbol, the monitoring device requests a complete adjustment of the configuration of the optical transmission interface of the first device, or a corrected adjustment of the configuration of the optical transmission interface of the first device in the other direction.

FIG. 10 schematically represents a third algorithm for determining whether the configuration of the optical transmission interface of the first device has to be adjusted.

In order to determine whether there is a mismatch between the carrier wavelength used by the first device to transmit optical signals to the second device and the passband of the optical band-pass filter present between the first device and the second device, the monitoring device monitors, in a step S1010, the evolution of a difference level $\Delta dec$ between codewords received by the second device via said optical signals and corresponding codewords transmitted by the first device. Then, in a step S1020, the monitoring device determines whether the configuration of the optical transmission interface of the first device has to be adjusted, on the basis of said monitoring.

FIG. 10 shows a detailed embodiment of the steps S1010 and S1020. More particularly, when the optical path between the first and second devices is subject to impairments, the monitoring device discriminates a part of the difference level $\Delta$dec evolution due to temperature variations and a part of the difference level $\Delta$dec evolution due to said impairments. Indeed, in case of such impairments, the contribution of said impairments in the evolution of said difference level $\Delta$dec shall not be confused with the contribution of the mismatch between the carrier wavelength and the passband of the optical band-pass filter in the evolution of said difference level $\Delta$dec, since adjusting the carrier wavelength would not help resolving decoding issues related to such impairments.

In a step S1001, the monitoring device obtains, from the second device, information representative of a difference level $\Delta$dec between codewords as transmitted by the first device and corresponding codewords as effectively received by the second device. The monitoring device thus obtains said information representative of a difference level $\Delta$dec for plural codewords received by the second device.

In a following step S1002, the monitoring device integrates, over a predetermined integration period, said information representative of the difference level $\Delta$dec. Said predetermined integration period is herein simply called integration period. In other words, the monitoring device obtains a mean difference level from the received information representative of the difference level $\Delta$dec for said plural codewords. The integration period may be a default value, for instance empirically defined, or defined according to the modulation scheme used for the optical transmissions from the first device to the second device, from which the codewords related to the integrated information are issued.

In a following step S1003, the monitoring device extracts a continuous and monotonic evolution of the difference level $\Delta$dec over plural integration periods. In other words, the monitoring device removes discontinuities in the evolution of the difference level $\Delta$dec. Indeed, when the temperature evolves and modifies the matching of the configuration of the optical transmission interface of the first device with the passband of the optical band-pass filter placed between the first device and the second device, the evolution of the impact of this temperature change on the difference level $\Delta$dec is expected to be continuous and monotonic. On the contrary, sudden impairments are expected to show discontinuities in the evolution of the difference level $\Delta$dec. The extracted continuous and monotonic evolution of the difference level $\Delta$dec over plural integration periods is therefore representative of the possible mismatch, due to a temperature change, between the configuration of the optical transmission interface of the first device and the passband of said optical band-pass filter. The extraction of said continuous and monotonic evolution of the difference level $\Delta$dec ends the step S1010.

In a following step S1004, the monitoring device checks whether the extracted evolution of the difference level $\Delta$dec is representative of an acceptable detuning according to at least one predefined criteria. Such a predefined criteria is for example, when said evolution is representative of a stable, or improving, difference level $\Delta$dec, for the monitoring device to consider that the extracted evolution of the difference level $\Delta$dec is acceptable. Fulfillment of such a criteria may be evaluated using the derivative according to time of the difference level $\Delta$dec. According to another example, such a predefined criteria is, when an accumulated difference level $\Delta$acc is above a certain threshold, for the monitoring device to consider that the extracted evolution of the difference level $\Delta$dec is not acceptable. According to another example, such a criteria is when the evolution of the difference level $\Delta$dec shows a change greater than the tuning granularity of the carrier wavelength by the optical transmission interface of the first device.

When the monitoring device considers that the extracted evolution of the difference level $\Delta$dec is representative of an acceptable detuning between the carrier wavelength of the optical signals and the nominal wavelength of the optical band-pass filter, a step S1005 is performed; otherwise, a step S1006 is performed.

In the step S1005, the monitoring device determines that the configuration of the optical transmission interface of the first device doesn't need to be adjusted.

In the step S1006, the monitoring device determines that the configuration of the optical transmission interface of the first device needs to be adjusted. The monitoring device may determine the extent to which the configuration of the optical transmission interface of the first device needs to be adjusted thanks to the aforementioned accumulated difference level $\Delta$acc.

Following the step S1006, the monitoring device, in its role of configuring device, instructs the first device to adjust the configuration of its optical transmission interface.

FIG. 11 schematically represents a fourth algorithm for determining whether the configuration of the optical transmission interface of the first device has to be adjusted.

In a step S1101, the second device performs measurements of signal strength of the optical signal over an integration period. For instance, the integration period represents the duration of one symbol of the optical signal. The second device then provides said measurements to the monitoring device, and the monitoring device determines information representative of variations of said signal strength over time. In a variant, the second device determines such variations and provides information representative of said variations to the monitoring device.

In a following step S1102, the monitoring device compares said variations of signal strength with a set of predefined signal strength variations. As shown in FIG. 2, knowing the signal strength variations of the received signal, the frequency shift between the nominal frequency of the optical band-pass filter and the actual carrier frequency of the optical signal transmitted by the first device to the second device may be deduced, especially when transmittance of the optical band-pass filter smoothly evolves, i.e. when such transmittance doesn't show abrupt curve slope changes between the flat top 200 and the edges 201, 202. Such predefined signal strength variations are for instance values stored in an LUT in correspondence with the frequency shift between said nominal frequency and said carrier frequency.

Relying on signal strength variations implies knowing an initial difference between the carrier wavelength used by the first device to transmit optical signals to the second device and the nominal wavelength of the optical band-pass filter. To achieve this, the monitoring device instructs the first device to perform an initial setup of the configuration of its optical transmission interface, according to which the second device receives an optical signal from the first device via the optical band-pass filter. The second device then performs the aforementioned signal strength measurements. Then, such a process is reiterated in order to scan the complete carrier frequency range. It has to be understood that the scan is considered complete, when the measures have been obtained for a predefined set of carrier frequencies within the frequency range. If the scan is not complete, the monitoring device instructs the first device to modify the setup of the configuration of its optical transmission interface, in order to select another carrier frequency within the carrier frequency range. The monitoring device then determines the suitable configuration of the optical transmission interface of the first device, on the basis of the signal strength measurements, which would involve a carrier frequency matching the nominal frequency of the optical band-pass filter. Indeed, the monitoring device, on the basis of the signal strength measurements, is able to determine the actual characteristics of the optical band-pass filter, and more particularly the frequencies defining the top (where transmittance is maximum) of the optical band-pass filter. The monitoring device, in it role of configuring device, then instructs the first device to perform a setup of the configuration of its optical transmission interface accordingly. Variations of the signal strength can then be interpreted by the monitoring device using as reference said configuration of the optical transmission interface of the first device.

In a following step S1003, the monitoring device checks whether the signal strength variations are representative of an acceptable detuning between the carrier wavelength used to transmit the optical signals and the nominal wavelength of the optical band-pass filter, and accordingly determines whether the configuration of the optical transmission interface of the first device has to be adjusted.

In a preferred embodiment, the monitoring device considers that the detuning is acceptable when the variations of signal strength are below a predefined threshold.

When the detuning is acceptable, a step S1104 is performed; otherwise, a step S1105 is performed. In the step S1104, the monitoring device determines that the configuration of the optical transmission interface of the first device doesn't need to be adjusted; whereas, in the step S1105, the monitoring device determines that the configuration of the optical transmission interface of the first device has to be adjusted.

Following the step S1105, the monitoring device in its role of configuring device sends instructions to the first device for adjusting the configuration of its optical transmission interface. As the monitoring device may not be aware whether the carrier frequency should be increased or decreased, the monitoring device may indicate a default direction in which the carrier frequency should be tuned. Then, once the first device has modified the configuration of its optical transmission interface, the monitoring device checks whether the signal strength variations for at least one following symbol shows an adjustment in the appropriate direction. If not, the monitoring device sends instructions to the first device for adjusting the configuration of its optical transmission interface in the other direction.

In a particular embodiment, when the monitoring device is not aware whether the carrier frequency should be increased or decreased, the monitoring device requests firstly a partial adjustment of the configuration of the optical transmission interface of the first device. Then, according to the signal strength variations for the considered following symbols, the monitoring device requests a complete adjustment of the configuration of the optical transmission interface of the first device, or a corrected adjustment of the configuration of the optical transmission interface of the first device in the other direction.

The invention claimed is:

1. A method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, wherein a monitoring device performs:
   determining information representative of a level of detuning between the carrier wavelength of the optical signals and the nominal wavelength of the optical band-pass filter by
   supplying successive pulses to said optical bandpass filter with increasing frequency shift therebetween, and
   monitoring pulse response of said optical bandpass filter from each pulse and determining the information of a level of detuning based on one or more values of the pulse response; and
   determining said equalization parameters, on the basis of said determined information representative of the level of detuning between the carrier wavelength of the optical signals and the nominal wavelength of the optical band-pass filter;
   performing equalization between the wavelengths of said carrier wavelength and band-pass filter for an optical channel as defined by said equalization parameters;
   monitoring an evolution of the level of detuning between the carrier wavelength of the optical signals and the nominal wavelength of the optical band-pass filter; and
   determining whether a configuration of an optical transmission interface of the first device has to be adjusted so as to modify the carrier wavelength of the optical signals, on the basis of said monitoring.

2. The method according to claim 1, characterized in that, when the monitoring device determines that the configuration of an optical transmission interface of the first device has to be adjusted, the monitoring device performs:
   obtaining an estimation of what would be the level of detuning between the carrier wavelength of the optical signals and the nominal wavelength of the optical band-pass filter if the first device adjusts the configuration of the optical transmission interface of the first device so as to modify the carrier wavelength of the optical signals;
   determining said equalization parameters on the basis of said estimation;
   sending instructions to the first device for adjusting the configuration of the optical transmission interface of the first device so as to modify the carrier wavelength of the optical signals;
   sending instructions to the first device and/or the second device for applying the equalization parameters determined on the basis of said estimation.

3. The method according to claim 2, characterized in that, when sending instructions for adjusting the configuration of the optical transmission interface of the first device and instructions for applying the equalization parameters, the monitoring device jointly transmits information representative of an instant at which said instructions shall be applied.

4. The method according to claim 1, characterized in that, for determining said equalization parameters, the monitoring device parses a look-up table matching predetermined equalization parameters with respective levels of detuning between the carrier wavelength of the optical signals and the nominal wavelength of the optical band-pass filter.

5. The method according to claim 4, characterized in that, for beforehand filling in the look-up table, the monitoring device performs a learning phase:
   obtaining channel estimation from learning phase optical signals transmitted by the first device to the second device via the optical pass-band filter;
   determining the equalization parameters to be filled in the look-up table from the obtained channel estimation; and
   determining the level of detuning, to be filled in the look-up table, between the carrier wavelength of the learning phase optical signals and the nominal wavelength of the optical band-pass filter;
   and in that the monitoring device reiterates the learning phase for another carrier wavelength of the learning phase optical signals.

6. A method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, wherein a monitoring device performs:
   determining information representative of a level of detuning between the carrier wavelength of the optical signals and the nominal wavelength of the optical band-pass filter by
   supplying successive pulses to said optical bandpass filter with increasing frequency shift therebetween, and
   monitoring pulse response of said optical bandpass filter from each pulse and determining the information of a level of detuning based on one or more values of the pulse response; and
   determining said equalization parameters, on the basis of said determined information representative of the level of detuning between the carrier wavelength of the optical signals and the nominal wavelength of the optical band-pass filter;
   performing equalization between the wavelengths of said carrier wavelength and band-pass filter for an optical channel as defined by said equalization parameters;
   wherein the monitoring of pulse response monitors an evolution of a difference level between codewords received by the second device via said optical signals and corresponding codewords transmitted by the first device.

7. A method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, wherein a monitoring device performs:
   determining information representative of a level of detuning between the carrier wavelength of the optical signals and the nominal wavelength of the optical band-pass filter by
   supplying successive pulses to said optical bandpass filter with increasing frequency shift therebetween, and
   monitoring pulse response of said optical bandpass filter from each pulse and determining the information of a level of detuning based on one or more values of the pulse response; and
   determining said equalization parameters, on the basis of said determined information representative of the level of detuning between the carrier wavelength of the optical signals and the nominal wavelength of the optical band-pass filter;
   performing equalization between the wavelengths of said carrier wavelength and band-pass filter for an optical channel as defined by said equalization parameters;
   wherein the monitoring of pulse response includes obtaining information representative of a signal temporal shape corresponding to a symbol of an optical signal received by the second device, from the first device, via the optical band-pass filter; and
   comparing the obtained information representative of the signal temporal shape with information representative of a set of predefined signal temporal shapes, each predefined signal temporal shape being representative of a respective level of detuning between the carrier wavelength of the optical signals and the nominal wavelength of the optical band-pass filter.

8. A method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, wherein a monitoring device performs:
   determining information representative of a level of detuning between the carrier wavelength of the optical signals and the nominal wavelength of the optical band-pass filter by
   supplying successive pulses to said optical bandpass filter with increasing frequency shift therebetween, and
   monitoring pulse response of said optical bandpass filter from each pulse and determining the information of a level of detuning based on one or more values of the pulse response; and
   determining said equalization parameters, on the basis of said determined information representative of the level of detuning between the carrier wavelength of the optical signals and the nominal wavelength of the optical band-pass filter;
   performing equalization between the wavelengths of said carrier wavelength and band-pass filter for an optical channel as defined by said equalization parameters;
   wherein the monitoring of pulse response includes determining the information representative of said level of detuning, based on a time drift between successive symbols of an optical signal received by the second device, from the first device, via the optical band-pass filter.

9. A method for determining equalization parameters for performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, wherein a monitoring device performs:
- determining information representative of a level of detuning between the carrier wavelength of the optical signals and the nominal wavelength of the optical band-pass filter by
  - supplying successive pulses to said optical bandpass filter with increasing frequency shift therebetween, and
  - monitoring pulse response of said optical bandpass filter from each pulse and determining the information of a level of detuning based on one or more values of the pulse response; and
- determining said equalization parameters, on the basis of said determined information representative of the level of detuning between the carrier wavelength of the optical signals and the nominal wavelength of the optical band-pass filter;
- performing equalization between the wavelengths of said carrier wavelength and band-pass filter for an optical channel as defined by said equalization parameters;
- wherein the monitoring of pulse response includes determining the information representative of said level of detuning from variations of signal strength of the optical signal received by the second device.

10. A computer program comprising program code instructions fixed in a tangible medium which can be loaded in a programmable device for implementing the method according to claim 1, when the program code instructions are run by the programmable device.

11. Information storage means storing a computer program comprising program code instructions which can be loaded in a programmable device for implementing the method according to claim 1, when the program code instructions are run by the programmable device.

12. A monitoring and equalization device for determining equalization parameters and performing equalization for optical signals transmitted by a first device to a second device via an optical band-pass filter, the second device being configured for receiving optical signals output by said optical band-pass filter and transmitted by the first device on a carrier wavelength when said carrier wavelength is comprised in the passband of the optical band-pass filter, said carrier wavelength and/or said passband of the optical band-pass filter being a priori unknown, characterized in that the monitoring and equalization device is configured to:
- determine information representative of a level of detuning between the carrier wavelength of the optical signals and the nominal wavelength of the optical band-pass filter by
  - supplying successive pulses to said optical bandpass filter with increasing frequency shift therebetween, and
  - monitoring pulse response of said optical bandpass filter from each pulse and determining the information of a level of detuning based on one or more values of the pulse response; and
- determine said equalization parameters, on the basis of said determined information representative of the level of detuning between the carrier wavelength of the optical signals and the nominal wavelength of the optical band-pass filter; and
- equalize the wavelengths of said carrier wavelength and band-pass filter for an optical channel as defined by said equalization parameters;
- monitor an evolution of the level of detuning between the carrier wavelength of the optical signals and the nominal wavelength of the optical band-pass filter; and
- determine whether a configuration of an optical transmission interface of the first device has to be adjusted so as to modify the carrier wavelength of the optical signals, on the basis of said monitoring.

* * * * *